(12) United States Patent
Jakob et al.

(10) Patent No.: US 7,776,938 B2
(45) Date of Patent: Aug. 17, 2010

(54) FOOD COATING COMPOSITION COMPRISING PROTECTIVE COLLOID-STABILIZED POLYACRYLATE DISPERSIONS, USE THEREOF AND COATED FOODS PRODUCED THEREWITH

(75) Inventors: Martin Jakob, Kelkheim (DE); Heinrich Harrer, Frankfurt (DE); Ivan Cabrera, Dreieich (DE)

(73) Assignee: Celanese Emulsions GmbH, Kronberg/Ts. (DE)

( * ) Notice: Subject to any disclaimer, the term of this patent is extended or adjusted under 35 U.S.C. 154(b) by 562 days.

(21) Appl. No.: 11/159,785

(22) Filed: Jun. 23, 2005

(65) Prior Publication Data
US 2005/0287257 A1    Dec. 29, 2005

(30) Foreign Application Priority Data
Jun. 23, 2004 (DE) .................. 10 2004 030 358

(51) Int. Cl.
A23C 19/16 (2006.01)
A23B 4/10 (2006.01)
A23B 7/16 (2006.01)
C09D 131/04 (2006.01)
C09D 133/10 (2006.01)

(52) U.S. Cl. .................. 523/100; 229/87.08; 426/125; 426/273

(58) Field of Classification Search .............. 523/100; 229/87.08; 426/125, 273, 310
See application file for complete search history.

(56) References Cited

U.S. PATENT DOCUMENTS

| | | | |
|---|---|---|---|
| 2,686,726 A | 8/1954 | Grantham | |
| 4,287,217 A | 9/1981 | Hammer et al. | |
| 4,397,968 A | 8/1983 | Eck et al. | |
| 4,525,418 A | 6/1985 | Dinklage et al. | |
| 4,529,634 A | 7/1985 | Hammer et al. | |
| 4,962,079 A * | 10/1990 | Matsumoto et al. | 503/226 |
| 5,246,750 A * | 9/1993 | Dinklage et al. | 428/34.8 |
| 2003/0055010 A1 | 3/2003 | De Haan | |
| 2004/0024094 A1 | 2/2004 | Stemmler | |
| 2005/0107515 A1 | 5/2005 | Jakob et al. | |

FOREIGN PATENT DOCUMENTS

| | | |
|---|---|---|
| CH | 419 816 | 8/1966 |
| DE | 1001576 | 1/1957 |
| DE | 3147519 | 7/1983 |
| DE | 3704563 | 8/1988 |
| EP | 0001545 | 5/1979 |
| EP | 0 062 106 | 10/1982 |
| EP | 0100056 | 2/1984 |
| EP | 0 538 571 | 4/1993 |
| EP | 0 671 420 | 9/1995 |
| EP | 0671420 | 9/1995 |
| EP | 0 986 965 | 3/2000 |
| EP | 1151671 | 11/2001 |
| WO | WO-03/054041 | 7/2003 |
| WO | WO-03101209 | 12/2003 |

* cited by examiner

Primary Examiner—Kelechi C Egwim
(74) Attorney, Agent, or Firm—Connolly Bove Lodge & Hutz LLP

(57) ABSTRACT

A description is given of food coating compositions comprising
a) a plastics dispersion or a mixture of plastics dispersions comprising at least one homo- or copolymer poly(meth) acrylate having at least 55% by weight (meth)acrylate monomer units and also 0.1 to 30% by weight of at least one protective colloid, and also
b) aids and/or additives used for producing food coatings.

The coatings are distinguished by sufficiently high water vapor transmission rates, low water absorption capacity and also low reemulsification capacity and have good mechanical properties in the moist state.

21 Claims, No Drawings

FOOD COATING COMPOSITION COMPRISING PROTECTIVE COLLOID-STABILIZED POLYACRYLATE DISPERSIONS, USE THEREOF AND COATED FOODS PRODUCED THEREWITH

The present invention relates to novel food coating compositions based on protective-colloid-stabilized polyacrylate dispersions and use thereof, in particular as antimicrobial finished aid for cheese ripening.

The use of plastic dispersions having a very varied polymer base for coating hard cheese has long been known. The surface treatment and the subsequent drying on of the dispersion generates an air-permeable water vapor barrier film which prevents not only mold formation on the cheese, but also excessively rapid drying out of the cheese loaf during ripening. During the ripening process, the cheeses pass through storage in moisture rooms lasting for a plurality of months. The unwanted growth of microorganisms is counteracted by an antimicrobial finish of the dispersions with special biocides, for example as described in EP-A-0 986 965. Generally, it is advantageous if there is no complete seal to water vapor due to the coating, but rather, sufficient flavor and rind formation can occur owing to controlled release of water from the ripening cheese.

As a base for such food coating compositions, dispersions especially based on homo- or copolymer poly(vinyl acetate), here in particular based on copolymers with alkyl maleates/fumarates or ethene, have already been described in the prior art.

Other monomers have also been described for food coating compositions. For instance, CH-A419,816, mentions vinyl chloride, vinyl propionate, vinylidene chloride, acrylic esters, styrene, crotonic acid, acrylonitrile, fumaric acid, itaconic acid, vinyl butyrate, vinylpyrrolidone and propylene. In the examples, copolymeric emulsions of vinyl acetate and acrylate monomers are also mentioned which are predominantly made up of vinyl acetate and in addition comprise up to 20 parts by weight of acrylate monomers such as 2-ethylstearyl acrylate, butyl acrylate, polyethoxyethyl methacrylate or methyl methacrylate in the polymer mass of the emulsion.

In example 6 of CH-A-419,816, a 50% strength emulsion of a copolymer consisting of 720 parts of vinyl acetate and 180 parts of methyl methacrylate is described, to which are added 50 parts each of polybutyl acrylate and also a fungicide.

US-A-2003/0055010 describes a method for establishing a high polyene fungicide activity in aqueous solution. These solutions likewise comprise polymer dispersions for coating foods and cheese. Preferred monomers for these dispersions are vinyl acetate, ethylene, vinyl esters of saturated fatty acids of chain lengths $C_2$-$C_{18}$, esters of maleic and fumaric acid with monovalent saturated aliphatic alcohols of chain lengths $C_4$-$C_8$ and also acrylic esters of monohydric aliphatic saturated alcohols of chain lengths $C_4$-$C_8$, or mixtures of alpha-olefins $C_{14}$-$C_{16}$. In the example section of the publication ®Mowilith LDM 5041 is mentioned a 45% strength copolymer dispersion of vinyl acetate and butyl acrylate.

The polymer dispersions specially produced as aids for cheese ripening must be customized firstly to the complex microbial sequence of cheese ripening, and secondly to the associated high expenditure on logistics. The requirements of the dispersions are set by the mechanical application in applying the coating, the climatic and microbial conditions during the moist room storage and on mechanical loading both in the mechanical handling in the moist room and later of the ripened cheese as end product during transport. This is ultimately achieved by suitable selection of appropriate stabilizers for the dispersion and also by the selection of suitable monomer systems.

WO 03/054041 describes a food coating composition based on copolymers of vinyl esters and dialkyl esters of malaeic or fumaric acid, which composition is distinguished from conventional products by a significantly improved film glossiness and at the same time an improved shear stability. At the same time, the coatings produced using this dispersion also have low water absorption and good wax adhesion.

Owing to the relatively high vinyl acetate content in the abovementioned solution batches based on copolymer poly(vinyl acetate)s, the films, despite significant proportions of relatively nonpolar comonomers, still have high hydrophilicity. Their water absorption is generally greater than 15% by weight. These films also have a tendency to reemulsifying, since the content of grafted protective colloid prevents complete film coalescence.

Furthermore, with respect to storage in ripening rooms with very high relative humidity, it would be a further technical advantage if more strongly hydrophobisized films were formed from the dispersions, which films, via a still lower water absorption and a reduced reemulsification, reduce the tendency of the cheese loaves to stick to one another and to the ripening shelf. The reduced reemulsification would also have the advantage that damage to the moist coating during turning of the cheeses by mechanical apparatuses would be reduced. However, on the other hand, the hydrophobisized film is still to be permeable to water vapor to be able to control the microbial ripening process.

Approaches for synthesizing protective-colloid-stabilized dispersions having in hydrophobic polymer composition can already be found in the prior art.

EP-A-62,106 describes a method for producing copolymers inter alia based on (meth)acrylate with increased water strength by emulsion polymerization in the presence of poly(vinyl alcohol) as protective colloid.

EP-A-538,571 discloses the production of aqueous and emulsifier-free dispersions, selected monomers being reacted in the presence of selected poly(vinyl alcohol)s in the monomer feed method. These plastics dispersions are based on >50% by mass (meth)acrylate.

EP-A-671,420 describes an aqueous protective-colloid-stabilized polyacrylate dispersion obtainable by emulsion polymerization of olefinically unsaturated monomers in the disperse phase using an oil-soluble free-radical-forming initiator and a water-soluble reducing agent at reaction temperatures between 40 and 90° C., a mixture of monomers consisting of 40 to 99.9% by weight alkyl (meth)acrylates having 1 to 18 carbon atoms in the alkyl chain and 0.1 to 60% by weight further monomers being polymerized in the presence of a mixture consisting of poly(vinyl alcohol) and hydroxyethylcellulose and, if appropriate, an anionic and/or nonionic emulsifier, without the addition of water-soluble regulators. Embodiments 13 and the comparative example B (stabilization with poly(vinyl alcohol)) lead to films which have a low water absorption at 9% and 8%, respectively.

In all publications, however, there is no information about the suitability as food or cheese coating composition.

The object underlying the present invention was to provide an improved food coating composition, in particular a coating composition and/or aid for cheese ripening, the films of which firstly have a sufficiently high water-vapor transmission rate and, secondly, have a relatively low water absorption capacity and also a low reemulsification capacity.

A further object of the present invention was the provision of a coated food which has, firstly, a coating having a sufficiently high water-vapor transmission rate, which coating, secondly, has a decreased surface stickiness compared with conventional vinyl acetate-based coating compositions and which, furthermore, in the moist state, has good mechanical properties, so that the coated food can be handled without risk of damage.

These objects are achieved by a food coating composition comprising a) a plastics dispersion or a mixture of plastics dispersions comprising at least one homo- or copolymer poly(meth) acrylate having at least 55% by weight (meth)acrylate monomer units and also 0.1 to 30% by weight of at least one protective colloid, and also b) aids and additives used in food-coating compositions, in particular aids and additives which are used in cheese coating compositions.

As foods which can be treated with the inventive coating compositions, those which are suitable are, in principle, all foods or their precursors, i.e. also seed material. In particular, foods are coated which are exposed to a risk of water loss during storage and which are given a prolonged keeping quality by a reduction of the rate of water loss. A further group of foods are preparations which, during a production or processing process, lose water in a specific manner in order by this means to develop a certain consistency and/or a certain flavor.

The invention also relates to the foods treated with the food coating composition.

Examples of inventively coated foods are fruits, preferably hard-shelled fruits, such as nuts, in particular citrus fruits, vegetables, in particular stem vegetables, meat products and sausage products, in particular hard sausages, cheese, in particular hard cheese, and seeds. In addition, the inventively used coating compositions are suitable for producing coatings as aids in the production of foods, in particular cheese.

The films produced from the inventive food coating composition are distinguished by a sufficiently high water vapor transmission rate. Typical water vapor transmission rates are in the range from 50 to 400 g/(m$^2$·24 h), preferably 100 and 230 g/(m$^2$·24 h), determined on films of 300μ layer thickness.

The films produced from the inventive food coating composition are also distinguished by a comparatively low water absorption capacity. Typical values are in the range from 5 to 50%, preferably from 5 to 20%, particularly preferably 5-15%, based on the dry mass of the film.

The inventively used homopolymer or copolymer polyacrylate dispersions are obtainable by emulsion polymerization of alkyl esters of acrylic acid or methacrylic acid in the presence of at least one protective colloid.

Suitable monomers are the (meth)acrylic alkyl esters having 1 to 18 carbon atoms in the alkyl chain. The acrylates are typically esters of acrylic acid with alcohols, such as, in particular, methanol, ethanol, n-butanol, isobutanol or 2-ethylhexanol.

Preferred monomers of this type are acrylic acid methyl, ethyl, n-butyl, isobutyl and 2-ethylhexyl esters.

The methacrylates are typically esters of methacrylic acid with alcohols, such as in particular methanol, ethanol, n-butanol, isobutanol or 2-ethylhexanol.

Preferred monomers of this type are methacrylic acid methyl, ethyl, n-butyl, isobutyl and 2-ethylhexyl esters.

Preference is given to the linear and branched alkyl esters of (meth)acrylic acid having 1 to 8 carbon atoms in the alkyl chain. These alkyl (meth)acrylates are used at a content of 55 to 100% by weight, based on the total amount of monomers.

For the polymerization, preferably, use is made of one hard monomer and one soft monomer, or a mixture of a plurality of soft monomers and also a mixture of a plurality of hard monomers.

The designation "hard" and "soft" relates to the position of the glass transition temperature of the homopolymer produced from the respective monomer relative to room temperature (25° C.). For instance, soft monomers form polymers having a glass transition temperature below room temperature, hard monomers form those having a glass transition temperature above room temperature. The glass transition temperature of the mixed polymer can be set below ambient temperature by the mixing ratio of hard and soft monomers. Preferably, mixing ratios of hard and soft monomers are sought after in which the polymers form a consolidated film at room temperature without the addition of external plasticizers. In particular, the minimum film formation temperature should be below 20° C.

Examples of hard monomers are methyl methacrylate, ethyl methacrylate, sec-butyl methacrylate and tert-butyl acrylate. Examples of soft monomers are ethyl acrylate, n-butyl acrylate and 2-ethylhexyl acrylate.

An inventively used copolymer poly(acrylate) dispersion can be made up of up to 45% by weight of monomer units other than (meth)acrylates.

These monomers can be, for example, vinyl esters of aliphatic, saturated carboxylic acids, preferably fatty acids having a chain length of $C_1$-$C_{18}$. Examples are vinyl formate, vinyl acetate, vinyl propionate, vinyl butyrate, vinyl isobutyrate, vinyl pivalate, vinyl 2-ethylhexanoate, vinyl esters of α-branched carboxylic acids having 9 to 11 carbon atoms in the acid radical (®Versatic acids), the vinyl esters of lauric, palmitic, myristic and stearic acids.

A further group is formed by maleic and fumaric esters of monohydric aliphatic alcohols of chain length $C_1$-$C_{18}$. These are those of saturated alcohols of chain length $C_1$-$C_{18}$, or those with monohydric aliphatic unsaturated alcohols of chain length $C_3$-$C_{18}$, but preferably those with saturated alcohols of chain length $C_4$-$C_8$, in particular dibutyl maleate, or di-2-ethylhexyl maleate and/or fumarate, in addition the esters of aliphatic carboxylic acids of chain length $C_3$-$C_{12}$ with unsaturated alcohols of chain length $C_3$-$C_{18}$, or esters of unsaturated aliphatic dicarboxylic acids with polyethylene glycols and/or polypropylene glycols.

The use of dibutyl maleate and/or fumarate as such a comonomer is particularly preferred.

A further group comprises vinyl chloride, vinylidene chloride, acrylonitrile and methacrylonitrile, ethylene, butadiene, isoprene, isobutylene, propylene, $C_{14}$-$C_{16}$ alpha-olefins, 2-chlorobutadiene, 2-3-dichlorobutadiene, tetrafluoroethylene, styrene, vinyl ethers of monohydric aliphatic saturated alcohols of chain length $C_1$-$C_{18}$, acrylic acid, methacrylic acid, crotonic acid, maleic acid, fumaric acid, itaconic acid, vinylsulfonic acid, styrenesulfonic acid, half esters of maleic and fumaric acid and of itaconic acid, with monohydric aliphatic saturated alcohols of chain length $C_1$-$C_{18}$ and also their alkali metal and ammonium salts, vinylpyrrolidone, amides of acrylic and methacrylic acid and N-methylolamides of acrylic and methacrylic acid and also their ethers, N-vinyl-N-methylacetamide, acrylic esters of diethylaminoethanol and/or methacrylic esters of dimethylaminoethanol, acrylic and methacrylic esters of dihydric aliphatic alcohols of chain length $C_2$-$C_{18}$, divinyl and diallyl esters of saturated and unsaturated aliphatic dicarboxylic acids of chain length $C_3$-$C_{18}$, vinyl and allyl esters of acrylic acid and crotonic acid, triallyl cyanurate and sodium 2-sulfoethyl methacrylate.

Preference is given to small amounts of this group, for example up to 5% by weight, based on the total amount of monomer, of ethylenically unsaturated ionic comonomers, for example α,β-monoethylenically unsaturated mono- and dicarboxylic acids, for example acrylic acid, methacrylic acid, maleic acid and itaconic acid and water-soluble salts thereof. These salts can further improve the colloidal stability of the dispersion.

The inventively used dispersion is stabilized by at least one protective colloid. This compound is preferably poly(vinyl alcohol) of a degree of hydrolysis of 70 to 100 mol % and viscosities of the 4% strength by weight aqueous solutions at 20° C. of 2 to 70 mPa·s.

Preferably the poly(vinyl alcohol) used has a degree of hydrolysis of 85 to 94 mol %, but mixtures of different degrees of hydrolysis in the range of 70 to 100 mol %, preferably 85 to 100 mol %, as described in WO 03/054041, can be used. The total amount is 0.1 to 30% by weight, preferably 0.1 to 20% by weight, in particular 1-15% by weight, based on the mass of the monomers used.

Further suitable protective colloids for producing the dispersion are methylcelluloses, hydroxyethyl- and propylcelluloses and also sodium carboxymethylcellulose. This group of compounds also covers gelatin, casein, starch, gum arabic, polyvinylpyrrolidone, hydroxyethyl starch, sodium alginate, and also homopolymers or copolymers from the polymers used for producing the copolymer, or their water-soluble salts, for example polyacrylic acid and polymethacrylic acid. These compounds can also be added before, during or after the polymerization, just like the poly(vinyl alcohol) used. It has proved to be advantageous to use a part of the protective colloid in the aqueous charge, and to feed a part, for example in the form of an emulsion together with the monomers used or parts thereof. The protective colloids can also be used as thickeners and added after completion of the polymerization for setting a suitable application viscosity.

In principle, other stabilizers, for example emulsifiers, can also be used in conjunction.

Suitable emulsifiers are sodium salts, potassium salts and ammonium salts of straight-chain aliphatic carboxylic acids of chain length $C_{12}$-$C_{20}$, sodium hydroxyoctadecanesulfonate, sodium salts, potassium salts and ammonium salts of hydroxy fatty acids of chain length $C_{12}$-$C_{20}$ and their sulfination and/or acetylation products, alkyl sulfates, also as triethanolamine salts, alkyl($C_{10}$-$C_{20}$) sulfonates, alkyl($C_{10}$-$C_{20}$) aryl sulfonates, dimethyidialkyl($C_8$-$C_{18}$) ammonium chloride, acyl, alkyl, oleyl and alkylaryloxethylates and their sulfination products, alkali metal salts of sulfosuccinic acid esters with aliphatic saturated monohydric alcohols of chain length $C_4$-$C_{16}$, sulfosuccinic acid 4-esters with polyethylene glycol ethers of monohydric aliphatic alcohols of chain length $C_{10}$-$C_{12}$ (disodium salt), sulfosuccinic acid 4-esters with polyethylene glycol nonylphenyl ether (disodium salt), sulfosuccinic biscyclohexyl ester (sodium salt), lignosulfonic acid and also its calcium, magnesium, sodium and ammonium salts, polyoxyethylene sorbitan monooleate having 20 ethylene oxide groups, resin acids, hydrogenated and dehydrogenated resin acids and also their alkali metal salts, dodecylinated diphenyl ether disulfonic sodium and also copolymers of ethylene oxide and propylene oxide having a minimum content of 10% by weight ethylene oxide. Those which are preferably used as emulsifiers are: sodium lauryl sulfate, sodium lauryl ether sulfate, if oxylated (3 ethylene oxide groups); the polyethylene glycol (4-20) ether of oleyl alcohol and also the polyethene oxide (4-14) ether of nonylphenol.

In particular, anionic and/or nonionic emulsifiers are suitable. These compounds are used at 0.0 to 5.0% by weight, based on the amount of total monomers, The solids content of the inventively used dispersion is 20 to 65% by weight, preferably 30 to 60% by weight, and particularly preferably 40 to 55% by weight.

The dispersions to be used inventively are preferably prepared by free-radical emulsion polymerization. The polymerization can be carried out in the batch method, in the feed-stream method, or combined batch/feed-stream methods. Preferably, however, the feed-stream method is employed, customarily a part of the monomers (1 to 15% by weight) being charged at the start of polymerization.

The production of aqueous polymer dispersions has previously been described many times and is therefore known to those skilled in the art [cf. e.g. Encyclopedia of Polymer Science and Engineering, vol. 8, pp. 659 ff (1987)].

Initiators are used for the free-radical initiation of the emulsion polymerization. As initiators, use is made of, for example: hydrogen peroxide, benzoyl peroxide, cyclohexanone peroxide, isopropyl cumyl hydroperoxide, persulfates of potassium, sodium and ammonium, peroxides of even-numbered saturated monobasic aliphatic carboxylic acids of chain length $C_8$-$C_{12}$, tertiary-butyl hydroperoxide, ditertiary-butyl peroxide, diisopropyl percarbonate, azoisobutyrodinitrile, acetylcyclohexanesulfonyl peroxide, tertiary-butyl perbenzoate, tertiary-butyl peroctoate, bis(3,5,5-trimethyl) hexanoyl peroxide, tertiary-butyl perpivalate, hydroperoxypinane, p-methane hydroperoxide. The above-mentioned compounds can also be used within a redox system, transition metal salts such as iron (II) sulfate or other reducing agents being used in conjunction. Reducing agents or regulators which can be used in conjunction are alkali metal salts of oxymethanesulfinic acid, mercaptanes of chain length $C_{10}$-$C_{14}$, but-(1)-en-(3)-ol, hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

Preferably, however, water-soluble persulfates, in particular ammonium persulfate or sodium persulfate, are used to start the polymerization.

After completion of the polymerization, for demonomerization, a further post-treatment can follow, preferably using redox catalysts, for example combinations of oxidizing agents with reducing agents such as ascorbic acid or further abovementioned reducing agents.

A physical demonomerization can also follow, for example by stripping with an inert gas or a steam distillation, or a combination of chemical and physical demonomerization can be carried out.

The inventive food coating composition comprises aids and additives used in food coating compositions. These can be processing aids, or in particular additives which give a desired property to the food coating composition.

Examples of aids and additives are dyes, biocides, thickeners, stabilizers or combinations of two or more of these additives.

Examples of thickeners are poly(vinyl alcohol) or cellulose ethers, such as methylcelluloses, hydroxyethyl- and propylcelluloses, and also sodium carboxymethylcellulose, in addition gelatin, casein, starch, gum arabic, hydroxyethyl starch, sodium alginate, lactose, silicon dioxide and also poly(acrylic acid) and polyvinylpyrrolidone. These compounds can be added to set a suitable application viscosity, after completion of the polymerization, or preferably after demonomerization, in addition to the compounds used as protective colloid.

Examples of stabilizers are low molecular weight neutralizing agents and complexing agents. These groups comprise, for example, hydroxides, carbonates, phosphates of alkali metals, ammonium, calcium, alkali metal salts of ethylenediaminetetraacetic acid and N-hydroxyethylenediaminetriacetic acid, citric acid, and also sodium acetate and phosphoric acid, ammonium chloride, sodium sulfate, homopolymer of 2-acrylamido-2-methylpropanesulfonic acid and its sodium, potassium and ammonium salts.

The biocides are substances for protecting the dispersion and/or the packaged substrate from microbial infestation. Preferably, use is made of preservatives such as ®Delvocid which are permitted in the relevant directives on provisions under food law on additives for cheese or the other foods to be coated.

Particularly preferably, fungicides are used.

To set the dispersion to give a finished food coating composition, in particular a cheese coating composition, use can be made of the dyes permitted in the relevant positive lists such as carotene (E 160a), annato (E 160b), carbo medicinalis vegetabilis (E 153), titanium dioxide (E 171), tartrazine (E 102), quinoline yellow (E 104), sunset yellow FCF (E 110), cochineal red A (E 124), indigotine (E 132), brilliant black BN (E 151) or litholrubine BK (E 180).

In addition to components a) and b), the inventive food coating compositions can further comprise any other desired polymer dispersions of identical or different monomer basis, in particular homopolymer or copolymer poly(vinyl ester) dispersions, provided that the required properties are not impaired, in particular the water absorption of the films does not fall below the desired value as a result.

The proportion of component a) in the inventive food coating composition is usually 75 to 99.999% by weight, preferably 80 to 99.9% by weight, based on the total mass.

The proportion of component b) in the inventive food coating composition is usually 0.001 to 25% by weight, preferably 0.1 to 20% by weight, based on the total mass.

The inventive food coating compositions have, compared with comparable products having a different monomer base, the advantage that they form a more water resistant film having a markedly reduced reemulsifiability and lower water absorption. Nevertheless, and unexpectedly, the film is sufficiently permeable to water vapor, so that controlled ripening of hard cheese can take place when used as cheese coating composition.

The inventively used dispersions are especially suitable as constituent for producing food coating compositions, in particular as aids for hard cheese ripening, but also for coating of other foods, for example fruits, vegetables, meat products and sausage products, in particular hard sausages, other cheeses such as soft cheeses, and seeds.

These uses are likewise subject matter of the present invention.

The following examples serve to illustrate the invention. Data on parts and percentages relate to the weight, unless otherwise stated.

EXAMPLE 1

3 parts of PVA 5-88 (poly(vinyl alcohol) having a Höppler viscosity of the 4% strength aqueous solution at 20° C. of 5 mPas and a mean degree of hydrolysis of 88 mol %) in 38 parts of water were charged into a polymerization reactor equipped with metering devices and temperature control. To this were added 8 per cent of a monomer solution consisting of 2 parts of PVA 5-88, 1.26 parts of acrylic acid, 50 parts of MMA (methyl methacrylate), 50 parts of BuA (butyl acrylate), 0.33 part of ascorbic acid and 54.6 parts of water. In this emulsion, a further 0.30 part of 1-dodecanethiol were dissolved before the addition. Then, 0.077 part of tertiary-butyl hydroperoxide (or 0.11 part of the commercial 70% strength solution) and 0.076 part of ascorbic acid (in each case in 0.83 part of water) were charged to initiate the reaction and prepolymerized for 15 minutes. Then, the remaining 92% of the monomer emulsion was metered in at 70° C. in 3 hours. In parallel therewith, a solution of 0.29 part of tertiary-butyl hydroperoxide (or 0.41 part of the commercial 70% strength solution) in 3.1 parts of water were metered in. The reaction temperature was 70-72° C. 30 minutes after the end of metering, a solution of 0.072 part of ascorbic acid in 0.80 part of water was added in 30 minutes. After a post-polymerization time of a total of 1.5 hours, 0.082 part of tertiary-butyl hydroperoxide (0.11 part of the 70% strength solution) in 0.83 part of water and 0.076 part of sodium formaldehydesulfoxylate in 1.4 parts of water were added at 60° C.

This produced a coagulate-free dispersion of solids content 51.8% by weight having a Brookfield RVT viscosity at 23° C. of 1 700 mPas.

EXAMPLE 2

The procedure of example 1 was followed, with the difference that the PVA solution in the charge comprised 33 parts instead of 38 parts of water and, in the monomer emulsion, 46 parts of water instead of 54.6 parts of water were used.

This produced a coagulate-free dispersion of solids content 54.6% by weight having a Brookfield RVT viscosity at 23° C. of 5 400 mPas.

EXAMPLE 3

The procedure of example 1 was followed, with the difference that poly(vinyl alcohol) having a Höppler viscosity of the 4% strength aqueous solution of 18 mPas instead of 5 mPa·s and a mean degree of hydrolysis of 88 mol % was used, and that the PVA solution in the charge comprised 44 parts instead of 38 parts of water and, in the monomer emulsion, 62 parts of water were used instead of 54.6 parts of water.

This produced a coagulate-free dispersion of solids content 48.4% by weight having a Brookfield RVT viscosity at 23° C. of 19 500 mPas.

EXAMPLE 4

The procedure of example 1 was followed, with the difference that poly(vinyl alcohol) having a Höppler viscosity of the 4% strength aqueous solution of 8 mPas instead of 5 mPa·s and a mean degree of hydrolysis of 88 mol % was used. The PVA solution in the charge was dissolved in 38 parts of water, as in example 1, and in the monomer emulsion, 54 parts of water were used instead of 54.6 parts of water.

This produced a coagulate-free dispersion of solids content 52% by weight having a Brookfield RVT viscosity at 23° C. of 6 800 mPas.

EXAMPLE 5

The procedure of example 1 was followed, with the difference that both in the charge and in the monomer emulsion, with an otherwise identical total amount, poly(vinyl alcohol)s having a Höppler viscosity of the 4% strength aqueous solution of 8 mPas and 18 mPa·s in a ratio of 1:1 and having a mean degree of hydrolysis of 88 mol % were used. The PVA solution in the charge was, as in example 1, dissolved in 38 parts of water, and in the monomer emulsion, 54 parts of water were used instead of 54.6 parts of water.

This produced a coagulate-free dispersion of solids content 51.6% by weight having a Brookfield RVT viscosity at 23° C. of 14 100 mPas.

COMPARATIVE EXAMPLE C1

This relates to a commercially available sample of ®Mowilith SDM 4230 KL, commercial product from Celanese Emulsions GmbH, a plastics dispersion based on vinyl acetate and dibutyl maleinate for coating foods, in particular hard cheese.

Food coating compositions were produced from all dispersions of examples 1-5. For this, the dispersions were first set to a pH of 4.5 (±=0.1) using 10% strength potassium hydroxide solution. The amount of 10% strength potassium hydroxide solution used was 2-2.5 parts based on 100 parts of the acidic dispersion. To this were added, based on in each case 100 parts by weight of the acidic dispersion, 0.2 part by weight of the food additive E 160b (commercial product of CSK Food Enrichment N.V.) and the composition was homogenized. In the case of example C1, only mixing with 0.2% E 160b was carried out, since the dispersion already had a pH of 4.5.

Methods used for investigating application properties for testing as food coating composition.

Reemulsion Test

A film spread on a glass plate and having a wet layer thickness of 300μ was dried overnight at room temperature and the mechanical stability was tested optically and mechanically after cold-water storage for 2 hours.

Water Absorption of the Films

One part of cheese coating dispersion was diluted with 2 parts of distilled water. At this dilution, a cast film was produced from which, after drying for 24 hours, approximately 3×3 cm squares of approximately 400 mg in weight were cut. These film pieces were dried for 24 hours at room temperature in the vacuum drying cabinet. The dried film pieces were weighed and were completely covered with distilled water so as to be completely bubble-free in a covered Petri dish. After 24 hours, each film piece was dried between two layers of adsorbent paper and was then immediately weighed.

The water absorption in % is given from the quotient:

[(Weight of the swollen film/weight of the dried film)
·100]−100

Wax Adhesion Test

The films are produced by pouring out 80 g of a dispersion diluted to 14% solids through a gaze onto a metal plate which is provided with a rim and has a surface area of 314 cm². In this manner, a dried polymer film of 300 μm layer thickness is produced. From this film, a round film piece having a diameter of 60 mm is cut out and is conditioned over a period of 48 h at a temperature of 23° C. and 50% relative humidity. The resultant film piece is used to seal a glass cylinder provided with a metal flange, into which cylinder 0.5 g of water has been weighed out in advance. Thereafter, the film upper side is coated so as to be 4 mm thick with completely molten yellow wax (®Paradip Yellow B1 from Paramelt B.V.) (80° C.). After a standing time of 5 h at 23° C. and 50% relative humidity, the composite polymer film/wax is taken off from the glass cylinder and separated by hand by pulling it apart. The adhesion is evaluated depending on resistance to separation:

(+)=Good adhesion with relatively strong deformation of the polymer film on separation.

(+/−)=Moderate adhesion with moderate deformation of the polymer film on separation.

(−)=Relatively poor adhesion with deformation of the polymer film occurring only slightly on separation.

This test allows conclusions to be drawn about the suitability as cheese coating composition, since, after completion of the ripening, the ripened cheese is sealed with paraffin wax.

Measurement of the Water Vapor Transmission Rate

To measure the water vapor transmission rate, first, in a similar manner to the procedure in the wax adhesion test, film pieces are produced and climatically conditioned.

The two film pieces were each clamped into a vessel, into the glass dish of which exactly 10 g of deionized water had been weighed in in advance. The vessel was a high metal cylinder having a wall thickness of 4 mm, a height of 20 mm and an internal diameter of 55 mm having a removable integrated glass dish. The round film piece having a diameter of about 60 mm was laid onto this glass dish between two rubber seals. To prevent water vapor from escaping between the two seal rings during the experiment, in addition, a metal ring was screwed by six screws onto the metal cylinder at the top. A film area of 23 cm² remained through which water could evaporate. After the vessel had been carefully screwed together, it was weighed together with the film on the analytical balance. The weight determination was repeated after 7 days. During this time the samples were stored at 23° C. and 50% relative humidity.

The Water Vapor Transmission Rate was Determined as Follows:

Calculation: water loss=1st weighing−reweighing (all values reported in g)

Calculation of diffusion:

$$\frac{\text{water loss}}{\text{area} \times \text{number of days}} = \frac{\text{water loss} \times 10^4}{23 \times 7} \left[\frac{g}{m^2 \cdot d}\right]$$

The values thus determined related to the film thickness used of 300 μm.

TABLE 1

Results of the tests of application properties

| | Example | | | | | |
|---|---|---|---|---|---|---|
| | 1 | 2 | 3 | 4 | 5 | C1 |
| Solids contents [%] | 51.8 | 54.8 | 48.7 | 52.0 | 52.0 | 42.0 |
| Brookfield RVT 23° C. | Sp. 3 | Sp. 5 | Sp. 6 | Sp. 5 | Sp. 6 | Sp. 5 |

TABLE 1-continued

Results of the tests of application properties

| | Example | | | | | |
|---|---|---|---|---|---|---|
| | 1 | 2 | 3 | 4 | 5 | C1 |
| viscosity [mPas] (20 rpm, Sp. = spindle) | 1005 | 4040 | 11700 | 5860 | 11150 | 6000 |
| Water absorption [%] | 12.6 | 14.4 | 14.0 | 16.9 | 14.8 | 26.5 |
| Water vapor permeability after 7 days [g/m² · d] | 112.3 | 107.1 | 118.1 | 111.6 | 120.6 | 170 |
| Wax adhesion | + | +/− | + | + | + | + |
| Reemulsification rating | 1) | 1) | 1) | 1) | 1) | 2) |

1) Slight blooming. Film mechanically strong and not reemulsifiable
2) Heavy blooming. Film reemulsifies and may readily be detached from the glass plate.

From these examples it can be seen that the inventive food coating compositions, compared with a comparable product of the prior art having a different monomer base, have the advantage that they form a more water-resistant film with significantly reduced reemulsifiability and lower water absorption. Nevertheless, and unexpectedly, the film is sufficiently permeable to water vapor, so that controlled ripening of hard cheese can take place when it is used as cheese coating composition.

The invention claimed is:

1. A food coating composition consisting of
   a) a plastics dispersion or a mixture of plastics dispersions consisting of at least one homo- or copolymer poly(meth)acrylate having at least 55% by weight (meth)acrylate monomer units, water, and at least one protective colloid, wherein said at least one homo- or copolymer poly(meth)acrylate was prepared in the presence of from 0.1 to 30% by weight of said at least one protective colloid, and wherein said at least one protective colloid is selected from the group consisting of polyvinyl alcohol, gelatin, casein, starch, gum Arabic, polyvinylpyrrolidone, hydroxyethyl starch, and sodium alginate; and
   b) an aid and/or additive used in food-coating compositions.

2. The food coating composition of claim 1, wherein said (meth)acrylate monomer units are derived from (meth)acrylic acid alkylesters having from 1 to 18 carbon atoms in the alkyl chain.

3. The food coating composition of claim 2, wherein said (meth)acrylic acid alkylesters are selected from the group consisting of methyl, ethyl, n-butyl, isobutyl, and 2-ethylhexylesters of acrylic acid and methyl, ethyl, butyl, isobutyl, and 2-ethylhexylesters of methacrylic acid.

4. The food coating composition of claim 2, wherein said (meth)acrylic acid alkylesters are linear and branched alkylesters of (meth)acrylic acid having from 1 to 8 carbon atoms in the alkyl chain and which are used at a content of from 55 to 100% by weight, based on the total amount of said monomer units.

5. The food coating composition of claim 1, wherein said plastics dispersion is derived from different (meth)acrylate monomer units which are selected in such a manner that the glass transition temperature of said plastics dispersion is below 20° C.

6. The food coating composition of claim 5, wherein said plastics dispersion is also derived from a second monomer unit different from said different (meth)acrylate monomer units wherein said second monomer unit is selected from the group consisting of vinylesters of aliphatic, saturated carboxylic acids, maleic acid and/or fumaric acid esters of monohydric aliphatic alcohols of chain length $C_1$-$C_{18}$, esters of aliphatic carboxylic acids of chain length $C_3$-$C_{12}$ with unsaturated alcohols of chain length $C_3$-$C_{18}$, and esters of unsaturated aliphatic dicarboxylic acids with polyethylene glycols and/or polypropylene glycols.

7. The food coating composition of claim 6, wherein said plastics dispersion is derived from up to 5% by weight of said second monomer unit, based on the total amount of monomer units, and wherein said second monomer unit is derived from ethylenically unsaturated ionic comonomers.

8. The food coating composition of claim 1, wherein said at least one protective colloid is a-poly(vinyl alcohol) having a degree of hydrolysis of from 70 to 100 mol %, wherein the viscosity of a 4% strength aqueous solution of said poly(vinyl alcohol) at 20° C. is in the range of from 2 to 70 mPa·s.

9. The food coating composition of claim 1, wherein said aid and/or additive of b) is selected from the group consisting of biocides, dyes, thickeners, stabilizers, and combinations thereof.

10. The food coating composition of claim 1, wherein said aid and/or additive of b) is at least one fungicide.

11. The food coating composition of claim 1, wherein said plastics dispersion or mixture of plastics dispersions of a) and said aid and/or additive of b) are selected in such a manner that a film-produced therefrom has a water vapor transmission rate of 50 to 400 g/(m²·24 h), as determined on a film of 300μ layer thickness.

12. The food coating composition of claim 1, wherein said plastics dispersion or mixture of plastics dispersions of a) and said aid and/or additive of b) are selected in such a manner that a film-produced therefrom has a water absorption capacity of 5 to 50%, based on the dry mass of said film.

13. A food coated with the food coating composition of claim 1.

14. The food coating composition of claim 2, wherein said (meth)acrylic acid alkylesters having 1 to 18 carbon atoms in the alkyl chain are formed from acrylic acid and/or methacrylic acid and methanol, ethanol, n-butanol, isobutanol, or 2-ethylhexanol.

15. The food coating composition of claim 7, wherein said ethylenically unsaturated ionic comonomers are selected from the group consisting of acrylic acid, methacrylic acid, maleic acid, itaconic acid, their water-soluble salts, and combinations thereof.

16. The food coating composition of claim 11, wherein said water vapor transmission rate is in the range of from 100 to 230 g/(m²24 h).

17. The food coating composition of claim 12, wherein said water absorption capacity is in the range of from 5 and 20%.

18. A method of coating a food comprising the step of coating food with the food coating composition of claim 1.

19. The method of claim 18, wherein said food is selected from the group consisting of fruits, vegetables, seeds, meat products, cheese products, and sausage products.

20. The method of claim 19, wherein said food is hard cheese.

21. The food coating composition of claim 1, wherein said at least one homo- or copolymer poly(meth)acrylate is prepared from at least one hard monomer and at least one soft monomer wherein said soft monomer forms polymers having a glass transition temperature below room temperature and said hard monomer forms polymers having a glass transition temperature above room temperature.

* * * * *